US012681327B2

(12) United States Patent
Muschielok et al.

(10) Patent No.: US 12,681,327 B2
(45) Date of Patent: Jul. 14, 2026

(54) DETERMINING EYE-OPTICALLY RELEVANT BIOMETRICS OF AT LEAST ONE EYE FROM AN IMAGE OF AN EYE AREA

(71) Applicant: Rodenstock GmbH, Munich (DE)

(72) Inventors: Adam Muschielok, Munich (DE); Lukas Gromann, Freising (DE)

(73) Assignee: Rodenstock GmbH, Munich (DE)

( * ) Notice: Subject to any disclaimer, the term of this patent is extended or adjusted under 35 U.S.C. 154(b) by 555 days.

(21) Appl. No.: 18/251,565

(22) PCT Filed: Nov. 3, 2021

(86) PCT No.: PCT/EP2021/080437
§ 371 (c)(1),
(2) Date: Jan. 5, 2024

(87) PCT Pub. No.: WO2022/096475
PCT Pub. Date: May 12, 2022

(65) Prior Publication Data
US 2025/0383557 A1 Dec. 18, 2025

(30) Foreign Application Priority Data

Nov. 3, 2020 (DE) .......................... 102020128951.0

(51) Int. Cl.
*G02C 7/02* (2006.01)
(52) U.S. Cl.
CPC ............. *G02C 7/027* (2013.01); *G02C 7/028* (2013.01)
(58) Field of Classification Search
CPC .................................. G02C 7/027; G02C 7/028
(Continued)

(56) References Cited

U.S. PATENT DOCUMENTS 8,388,137 B2 3/2013 Dreher et al.
9,033,502 B2 * 5/2015 Nistico .................... A61B 3/14
351/246
(Continued)

FOREIGN PATENT DOCUMENTS

CN 105637512 A 6/2016
CN 109804302 A 5/2019
WO 2021185758 A1 9/2021

OTHER PUBLICATIONS

Feb. 14, 2022 (PCT) International Search Report and Written Opinion—App. PCT/EP2021/080437.
(Continued)

*Primary Examiner* — William R Alexander
(74) *Attorney, Agent, or Firm* — Banner & Witcoff, Ltd.

(57) ABSTRACT

A computer-implemented method for determining individual biometric parameters of at least one eye and to a corresponding method for manufacturing spectacle lenses, taking into account determined biometric data. The method includes providing image data comprising: at least one image of at least a part of an eye area of the user, and/or geometric information about at least a part of the eye area of the user, which results directly from at least one image of at least a part of the eye area of the user; and determining individual additional data including at least one individual biometric parameter of the at least one eye of the user, based on the image data provided, and using a statistical model describing a relation between the image data and the additional data.

9 Claims, 5 Drawing Sheets

(58) Field of Classification Search
 USPC ..................................................... 351/159.74
 See application file for complete search history.

(56) References Cited

U.S. PATENT DOCUMENTS

| | | | |
|---|---|---|---|
| 9,696,563 B2 | 7/2017 | Trumm et al. | |
| 9,910,294 B2 | 3/2018 | Altheimer et al. | |
| 2005/0200809 A1 | 9/2005 | Dreher et al. | |
| 2014/0055747 A1* | 2/2014 | Nistico .................... | A61B 3/14 |
| | | | 351/246 |
| 2014/0340637 A1* | 11/2014 | Trumm ................. | A61B 3/112 |
| | | | 351/159.76 |
| 2016/0335512 A1* | 11/2016 | Bradski .................. | G06V 10/82 |
| 2018/0136486 A1* | 5/2018 | Macnamara ............. | A61B 3/00 |
| 2019/0258930 A1 | 8/2019 | Ohlendorf et al. | |
| 2020/0073143 A1* | 3/2020 | Macnamara ............. | A61B 3/14 |
| 2020/0285071 A1 | 9/2020 | Trumm et al. | |
| 2022/0413319 A1* | 12/2022 | Trumm .................... | A61B 3/04 |
| 2023/0333410 A1* | 10/2023 | Macnamara ............. | A61B 3/14 |

OTHER PUBLICATIONS

Jul. 25, 2025 (CN) Office Action—App. 202180088925.4.
May 18, 2026 (EP) Office Action—App. 21805493.0.

* cited by examiner

10

Reference data set

Image data

Camera image(s) and/or geometric data from camera image(s);
Optional: PD, pupil diameter, pupil shape/position, iris shape/position, etc.

— 12

Aditional data

Eye length, corneal topography, lower and/or higher order aberrations of the cornea, refractive indices of the optical media of the eye, eye lens data, etc.

— 14

Linear Regression

2

Output layer
vector f(x)
(dimension K)

Input layer
vector x
(dimension D)

Data set

1

Task 1

$W$ $f(x) = Wx$

Task 1 has K output
variables,
for example

Nonlinear regression

$$f(x) = \sigma\left(W^3\sigma\left(W^2\sigma(W^1x)\right)\right)$$

$\sigma(a)$: Activation function,
e.g. Rectified Linear Unit (ReLU)

Pupillary distance / mm

Spherical equivalent of the refraction M / dpt

DETERMINING EYE-OPTICALLY RELEVANT BIOMETRICS OF AT LEAST ONE EYE FROM AN IMAGE OF AN EYE AREA

TECHNICAL FIELD

The present invention relates to a (computer-implemented) method for determining biometric data of an eye and to a corresponding method for manufacturing spectacle lenses taking into account the biometric data determined. Furthermore, the invention relates to corresponding computer program products and devices.

BACKGROUND

In the calculation of spectacle lenses, in particular progressive spectacle lenses, the biometrics of the eye of the spectacle wearer can be taken into account, as described in document U.S. Pat. No. 9,910,294 B2, for example. These biometric spectacle lenses offer great advantages, since the quality of the imaging is no longer evaluated at the vertex sphere, a virtual point of a simple model, but where the imaging actually takes place: on the retina of the eye. Thus, interactions between the individual aberrations, which arise during refraction and propagation through the media of the eye, are also taken into account.

The disadvantage of this method, however, is that extensive measurements with complex equipment and devices are necessary. This leads to great effort and high costs. As a result, the advantages of high-quality biometric spectacle lenses are only available to a relatively small proportion of those with visual defects.

SUMMARY

It is an object of the present invention to make extensive use of the advantages of biometric spectacle lenses without having the disadvantages of the complex measurement.

This object is achieved by a computer-implemented method for determining biometric data of an eye, a corresponding device, and a corresponding computer program product, as well as a method and a corresponding device for manufacturing a spectacle lens with the features specified in the respective independent claims.

The present invention is based on the surprising finding that it is possible to determine or derive individual biometric parameters of at least one of the eyes of a user, which are used for improved individual calculation or manufacture or adjustment of a spectacle lens, using data that result from one or more images of at least a part of an eye area of the user. It is thus possible to calculate and manufacture individual biometric spectacle lenses with high imaging quality and wearing comfort, without a complex and cost-intensive measurement of the additional biometric data being necessary for this.

A first aspect of the invention relates to a computer-implemented method for determining individual biometric parameters of at least one of the eyes of a user, comprising:
- providing image data comprising or consisting of:
  - at least one image of at least a part of an eye area of the user; and/or
  - geometric information about at least a part of the eye area of the user, which result directly from at least one image of at least a part of the eye area of the user;
- determining individual additional data including at least one individual biometric parameter of the at least one eye of the user, based on the image data provided, and using a statistical model describing a relation between the image data and the additional data.

The invention is particularly advantageous in that the image data can be or could have been recorded with common and very simple devices (cameras), which in particular do not have to be designed so that the additional data can be determined directly from the image data. For example, the method offers advantages if the individual additional data cannot be determined directly from the individual image data of the person being measured, because such a relation cannot be derived from the measurement method used without additional information about corresponding additional data from other persons, e.g. because the device providing the image data is not able to measure the additional information directly.

The statistical model can be derived or may have been derived using statistical analysis of a training data set with a plurality of reference data sets, each of the reference data sets including image data and additional data assigned to the image data. The method can comprise providing the statistical model describing the relation between image data and additional data. Alternatively or in addition, the method can comprise providing a training data set and deriving the statistical model using statistical analysis of the training data set. Deriving the statistical model can comprise, for example, training an original (non-trained) model using the training data set. For example, the model can comprise several model parameters altered or adapted during training with the training data set.

The term "providing" within the meaning of the present application includes "specifying", "transmitting", "obtaining", "reading out", "retrieving from a memory, a database and/or a table", "receiving", etc. The term "determining" within the meaning of the present application also includes "specifying", "calculating", "identifying", "predicting", etc.

The value of at least one parameter of a person, which is associated with the biometrics of one eye—or advantageously both eyes—of the person is thus estimated in a data set associated with the person, the data set including data that is associated with images of at least a part of the eye area or have been determined therefrom. A statistical model is used for the determination, in which relations between the said parameter and the data associated with at least one image of a part of the eye area, which apply at least to a plurality of people, are mapped.

The value thus determined can be taken into consideration in the calculation of spectacle lenses or other ophthalmic lenses such as contact lenses or intraocular lenses.

Image Data

Image data within the meaning of the present description is in particular data that is associated with images of at least a part of the eye area of a user. This concerns, for example, either directly images, in particular camera images, of at least a part of the eye area and/or (in particular geometric) data/information about at least a part of the eye area of the user, which result directly from at least one image of at least a part of the eye area of the user or can be derived therefrom, or such data/information that was derived directly from at least one image of at least a part of the eye area of the user.

For example, camera images themselves can be used in the method in order to determine an pupillary distance therefrom, for example, on the basis of which additional data is then determined using the statistical model, or the individual pupillary distance determined from camera images is provided as image data in order to then determine the additional data using the statistical model. It is also possible to determine the additional data directly from the individual camera image without first explicitly determining an individual value of the pupillary distance.

These statements on the image data apply both to individual image data, which are used e.g. in the context of an individual order to determine individual biometric data, and to statistic image data as such image data that can be part of corresponding reference data in the context of a training data set, on the basis of which the statistical model has been or can be created or trained.

In preferred embodiments, the image data includes one or more of the following parameters or the image data consists of one or more of the following parameters:

one or more camera images in which at least one eye, preferably both eyes, can be seen in particular from the front;

one or more camera images in which at least one eye can be seen in particular from the side;

pupillary distance;

distance of the corneal apex to the plane in which the iris lies;

geometric course of a section of the cornea surface (e.g. the vertical section of the cornea in a camera image from the side);

distance of the ocular centers of rotation (in particular as optical ocular centers of rotation);

corneal diameter (white-to-white, in particular measured horizontally);

the shape and/or position of the pupil or its parts (in a given representation, e.g. as closed or open polygon, as spline coefficients, etc.);

the shape and/or position of the outer edge of the iris or parts thereof (in a given representation, e.g. as closed or open polygon, as spline coefficients, etc.);

3D models of the eye area (e.g. as 3-dimensional point clouds, 3-dimensional edge networks that can be determined using depth cameras, etc.);

current direction of sight;

presence of heterophoria and/or preferably its form/extent.

Additional Data

Additional data is or includes biometric data of at least one of the eyes of a user, in particular such biometric data that cannot be read or measured directly from the image data (e.g. as geometric distances between marked points), but which, for example, are determined or have been determined conventionally, in particular optionally (e.g. by an optician) in connection with an order for spectacle lenses and are taken into account in particular in the case of an individual selection and/or optimization and/or adjustment of spectacles or at least a spectacle lens. For example, the additional data can include data that (usually) can be recorded or have been recorded with an aberrometer, a topgraph, a Scheimpflug camera, an OCT, a biometer, a fundus camera, a (low-coherence) laser reflectometer and/or another measuring device or another method of objective refraction.

In preferred embodiments, the at least one individual biometric parameter includes one or more of the following parameters:

eye length (in particular the geometric overall length of the eye);

optical length of the eye (integral of the refractive index along a light beam of a given wavelength, such as 550 nm, passing through the point of sharpest vision on the retina and the center of the pupil);

one or more geometric distances and/or optical path lengths between the vertices of the refracting surfaces of an eye to each other or to another common reference point (e.g. the point of sharpest vision on the retina);

shape of the refracting surfaces (e.g. shape and/or tilting of the cornea or one of the lens surfaces) which can be present in a given parameterization (e.g. via radii of curvature in principal sections and their orientation, Zernike coefficients of the vertex depth, geometric curvatures or equivalent representations, e.g. as power vector or as polar representation) and which is to be understood relative to a coordinate system (e.g. relative to a coordinate system in which the direction of sight coincides with the negative direction of the z-axis and the x-axis lies in the horizontal plane);

diameter or radius of the physical aperture of the eye (i.e. the opening of the iris) or the optical entrance pupil (image of the iris through the cornea) which may be given for a given lighting condition (e.g. a given or average indoor lighting) that differs in particular from the lighting conditions prevailing when the image data was recorded;

refractive indices of the optical media of the eye;

size and/or shape of the retina, in particular size and/or shape of the fovea;

orientation of the retina (in particular the fovea), e.g. as the direction of a vector perpendicular to the retina in the point of sharpest vision relative to the light incidence direction (e.g. a light ray passing through the center of the pupil and the point of sharpest vision);

position and orientation of receptors on the retina;

size of the receptive fields on the retina.

The biometric data of at least one of the eyes of a user can relate in particular to data of an individual eye or data of one or both eyes relative to the head or data of both eyes relative to one another.

The additional data can in particular include one or more of the following parameters: the higher order aberrations of the eye or at least the cornea (such as coma, trefoil, secondary astigmatism, spherical aberration, etc.), the lower and higher order aberrations of the cornea (sphere (Sph), cylinder (Cyl), axis (or M, J0, J45), coma, trefoil, secondary astigmatism, spherical aberration, etc.), the anterior chamber depth, the pupil sizes in the distance and near and/or under mesopic and photopic conditions.

The additional data in the reference data sets may be data that has been recorded or measured for earlier orders of biometric spectacle lenses in addition to the image data, for example with an aberrometer, a topographer, a Scheimpflug camera, an OCT, a biometer, a fundus camera, a (low-coherence) laser reflectometer and/or another measuring device.

The individual additional data specified based on a user's standard individual data and the additional data determined using the statistical model may, but need not, be the same type of additional data included in the reference data sets and used to derive the statistical model.

Statistical Model

The statistical model can be any statistical model that is derived from an existing data set (training data set) using statistical methods. Exemplary statistical methods are regression (such as linear regression in particular of nonlinear features, nonlinear regression, nonlinear regression with an attention mechanism, nonlinear multi-task regression, nonparametric or semiparametric regression, etc.), classification methods, and other machine learning methods. Machine learning algorithms are e.g. described in Jeremy Watt, Reza Borhani, Aggelos Katsaggelos: Machine Learning Refined: Foundations, Algorithms, and Applications, Cambridge University Press, 2020.

The statistical model receives at least part of the individual image data and/or variables derived therefrom as input variables and uses them to calculate at least part of the additional individual biometric parameters or additional data. The relation between image data and image data specified by the statistical model can be a linear or nonlinear relation. Furthermore, the relation can be multi-parametric.

In preferred embodiments, at least the statistical model includes one or more of the following models or it is preferably based on one or more of the following models:

a linear model (possibly associated with nonlinear features, e.g. nonlinear functions of the parameters representing the geometric information about the eye area);

a Gaussian process;

a neural network (e.g. deep neural network);

a decision tree or regression tree (regression tree);

a Boltzmann machine (restricted Boltzmann machine)

a support vector machine.

Exemplary statistical models are linear or nonlinear regression models. For example, neural networks, which also include deep neural networks, can be used as nonlinear regression models. It is also possible to use other nonlinear regression models known from the field of machine learning. The regression models, such as the neural network, can be trained using the training data set provided.

The statistical model can also be a combination of several statistical models of different types, for example a combination of a linear regression model, a nonlinear regression model (such as a neural network), a classification model and/or another statistical model.

Preferably, the statistical model is further improved as new data is added (e.g. ongoing training of a neural network with new data). In order to improve the estimation or prediction by the statistical model, additional parameters not associated with the eye area can be used in addition to the data associated with images of the eye area, e.g. age, gender, ethnicity, height, weight, head circumference, etc. The statistical model may also include constraints (e.g. that the predicted eye model is consistent with a known refraction).

The statistical model derived from the training data set can be stored in a suitable storage device such as a database, calculator, computational or data cloud. At least part of the training data set used for the derivation can be stored together with the statistical model.

The statistical model derived from a training data set can also be checked and/or modified continuously or at regular intervals, for example on the basis of new reference data sets. Accordingly, the method may include modifying the statistical model.

Training Data Set

The statistical model, which describes the relation between image data and additional data, is derived using statistical methods on the basis of a training data set with a plurality of individual data sets (reference data sets). Each of the reference data sets can include, for example, image data and the additional data of a specific user determined using suitable measurement methods. The different reference data sets in the training data set can preferably include the data (image data and additional data) from a plurality of different users (reference users).

To this end, existing orders for biometric spectacle lenses can be used to train a neural network or another statistical model with the data sets. In the case of a new individual order, the additional measurement data (additional data) can be calculated or forecast using the trained statistical model and based on the individual image data included in the new order. Thus, biometric spectacle lenses can be calculated based on individual image data and additional data calculated therefrom using the neural network or other statistical models.

The number of reference data sets can vary. For example, more than 10, 100, 1,000, 10,000, 100,000, or 1,000,000 reference data sets may be used. The reference data sets preferably cover a large, preferably the entire, range in which spectacle lenses can be ordered later on. For example, the reference data sets can cover the range of refraction values, e.g. −20 dpt to +20 dpt for sphere and −8 dpt to +8 dpt for cylinder.

Furthermore, the method for determining individual biometric parameters of at least one of the eyes of a user can comprise transmitting the individual image data and the calculated individual additional data to an external entity, such as a manufacturer of ophthalmic lenses, a manufacturing unit, a manufacturing device, etc.

A second aspect of the invention relates to a method for manufacturing a spectacle lens, comprising:

determining individual additional data including at least one individual biometric parameter of the at least one eye of the user, based on the provided image data according to one of the inventive methods described here, in particular in one of the preferred embodiments described here; and calculating the spectacle lens based on the determined individual additional data.

For example, the spectacle lens can be calculated using the method described in U.S. Pat. No. 9,910,294 B2 or using another known method in which individual biometric parameters are taken into account when calculating the spectacle lens. The method can also comprise manufacturing the calculated spectacle lens. The spectacle lens can be a single-vision spectacle lens, a multifocal spectacle lens or a progressive spectacle lens, for example.

In particular, the invention relates to a method for manufacturing a spectacle lens and/or a method for providing a manufacturing data set for manufacturing a spectacle lens, comprising:

providing image data including:

at least one image of at least an eye area of a user; and/or geometric information about at least a part of the eye area of the user, which result directly from at least one image of at least a part of the eye area of the user;

determining individual additional data including at least one individual biometric parameter of at least one eye of the user based on the provided image data and using a statistical model describing a relation between the image data and the additional data; and calculating the spectacle lens based on the determined individual additional data.

A third aspect of the invention relates to a computer-implemented method for determining a statistical model, the method comprising:

providing a training data set with a plurality of reference data sets, each of the reference data sets comprising image data and additional data associated with the image data;

deriving, using statistical analysis of the training data set, a statistical model describing a relation between the image data and the additional data, storing the statistical model in a storage device.

A fourth aspect of the invention relates to a computer program product which, when loaded into and executed on the memory of a computer, causes the computer to carry out a method according to one the above aspects.

With regard to the methods and computer program products described above, the aforementioned preferred embodiments and the aforementioned advantages apply analogously.

The method according to one of the above aspects can be carried out using a correspondingly designed device. Thus, a fifth aspect of the invention relates to a device for determining individual biometric parameters of at least one of the eyes of a user, the device comprising a calculating device designed to carry out the above-described method for determining individual biometric parameters.

In particular, the invention provides a device for determining individual biometric parameters of at least one of the eyes of a user, the device comprising a calculating device designed to carry out the following:

providing image data including:
at least one image of at least an eye area of a user; and/or
geometric information about at least a part of the eye area of the user, which result directly from at least one image of at least a part of the eye area of the user;
determining individual additional data including at least one individual biometric parameter of at least one eye of the user based on the provided image data and using a statistical model describing a relation between the image data and the additional data.

The calculating device can preferably comprise:
an image data input interface for providing individual image data of the user, the image data including:
at least one image of at least a part of an eye area of the user; and/or
geometric information about at least part of the eye area of the user, which result directly from at least one image of at least a part of the eye area of the user;
an additional data calculating device for calculating individual additional data, comprising at least one individual biometric parameter of the at least one eye of the user, the calculation taking place based on the individual image data and using a statistical model, the statistical model being derived using statistical analysis of a training data set with a plurality of of reference data sets, each of the reference data sets comprising image data and additional data associated with the image data.

Furthermore, the device can comprise a model input interface for providing the statistical model. For example, the statistical model may be stored in a device, such as a database, a calculator, and/or a data or calculator cloud. Furthermore, the device can provide a training data set input interface for providing the training data set; and a model calculating device for deriving or calculating the statistical model using statistical analysis of the training data set. The statistical model can be derived or calculated by training an original (untrained) model using the training data set, for example.

A sixth aspect of the invention relates to a device for manufacturing a spectacle lens and/or for providing spectacle lens manufacturing data, comprising:
a device for determining individual biometric parameters of at least one of the eyes of a user according to the fifth aspect;
a lens calculating device designed to calculate the spectacle lens based at least on the calculated individual biometric parameters.

The manufacturing device can also comprise a manufacturing device for manufacturing the calculated spectacle lens.

The above-mentioned devices for providing, determining, specifying or calculating data (such as (individual) image data, (individual) additional data, statistical models, model parameters, weighings, etc.) can be realized by suitably configured or programmed data processing devices (in particular specialized hardware modules, computers or computer systems, such as computer or data clouds) with appropriate computing units, electronic interfaces, storage and data transmission units. The devices may further comprise at least a preferably interactive graphical user interface (GUI) allowing a user to view and/or input and/or modify data.

The devices mentioned above can also have suitable interfaces that enable data (such as training data sets, reference data sets, (individual) image data, (individual) additional data, etc.) to be transmitted, input and/or read out. The devices can also include at least one storage unit, e.g. in the form of a database, which stores the data used.

The manufacturing device can e.g. comprise at least one CNC-controlled machine for the direct processing of a lens blank according to the determined optimization specifications. Alternatively, the spectacle lens can be manufactured using a casting process. The finished spectacle lens can have a first simple spherical or rotationally symmetric aspherical surface and a second individual surface calculated as a function of the individual image data and the calculated individual additional data. The simple spherical or rotationally symmetric aspheric surface may be the front surface (i.e., the object-side surface) of the spectacle lens. However, it is of course possible to arrange the individual surface as the front surface of the spectacle lens. Both surfaces of the spectacle lens can also be calculated individually.

The device for manufacturing a spectacle lens can be designed in one piece or as an independent machine, i.e. all components of the device (in particular the device for determining individual biometric parameters of at least one of the eyes of a user and the lens calculating device) can be part of one and the same system or be one and the same machine. In a preferred embodiment, however, the device for manufacturing a spectacle lens is not designed in one piece, but is realized by different (in particular independent) systems or machines. For example, the device for determining individual biometric parameters of at least one of the eyes of a user and the lens calculating device can be realized as a first system (in particular comprising a computer) and the manufacturing device as a second system. The various systems can be located at different locations, i.e. they can be physically separated from each other. For example, one or more systems can be located in the frontend and one or more other systems in the backend. The individual systems can, for example, be located at different company locations or operated by different companies. Here, the individual systems have, in particular, communication means in order to exchange data with one another. Preferably, the different systems of the device can communicate with each other directly, in particular via a network (e.g. via a local area network and/or via the Internet). The above statements on the device for manufacturing a spectacle lens apply not only to this device, but in general to all devices described within the scope of the present invention. In particular, a device described herein can be designed as a system. In particular, the system can comprise a number of devices (possibly locally separated), which are designed to carry out individual method steps of a corresponding method.

A further aspect of the invention relates to a spectacle lens manufactured according to the manufacturing method described above. Furthermore, the invention offers a use of a spectacle lens manufactured according to the manufacturing method described above in a predetermined average or ideal or individual position of wear of the spectacle lens in front of the eyes of a specific user for correcting a user's visual defect.

BRIEF DESCRIPTION OF THE DRAWINGS

In the following, preferred embodiments of the present invention will be described by way of example with reference to accompanying figures. Individual elements of the described embodiments are not limited to the respective embodiment. Rather, elements of the embodiments can be combined with one another as desired and new embodiments can be created thereby. The figures show.

DETAILED DESCRIPTION

Figure 1:
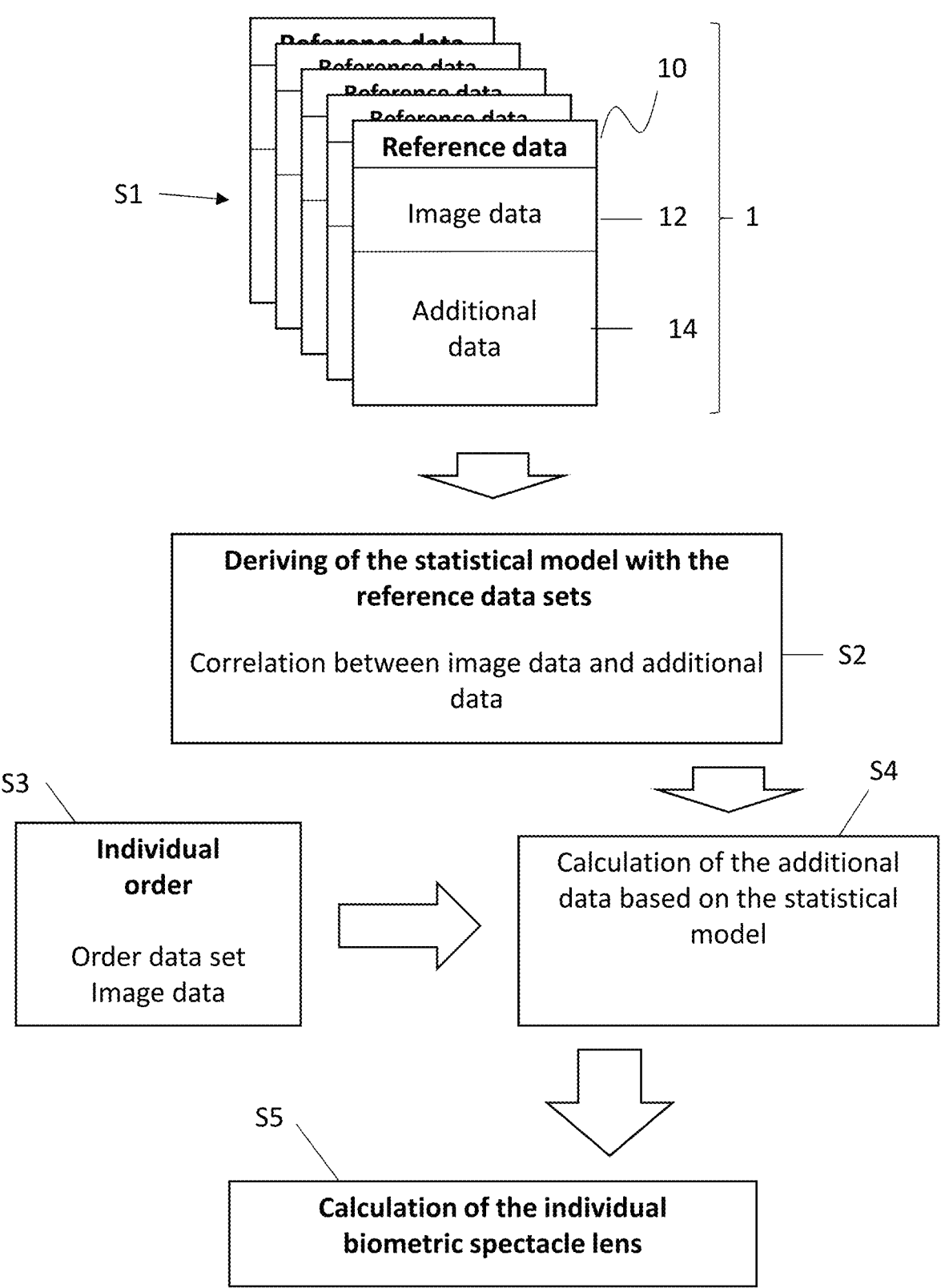
FIG. 1 an exemplary method for determining individual biometric data of at least one of the eyes of a user and calculating a spectacle lens.

FIG. 1 shows an exemplary method for determining individual biometric parameters of at least one of the eyes of a user and for calculating a spectacle lens based on the determined individual biometric parameters. The method comprises the following steps:

Step S1: Creation or provision of a training data set 1 from a plurality of data sets (reference data sets) 10, each reference data set including image data 12 and additional data 14 assigned to this image data.

Figure 2:
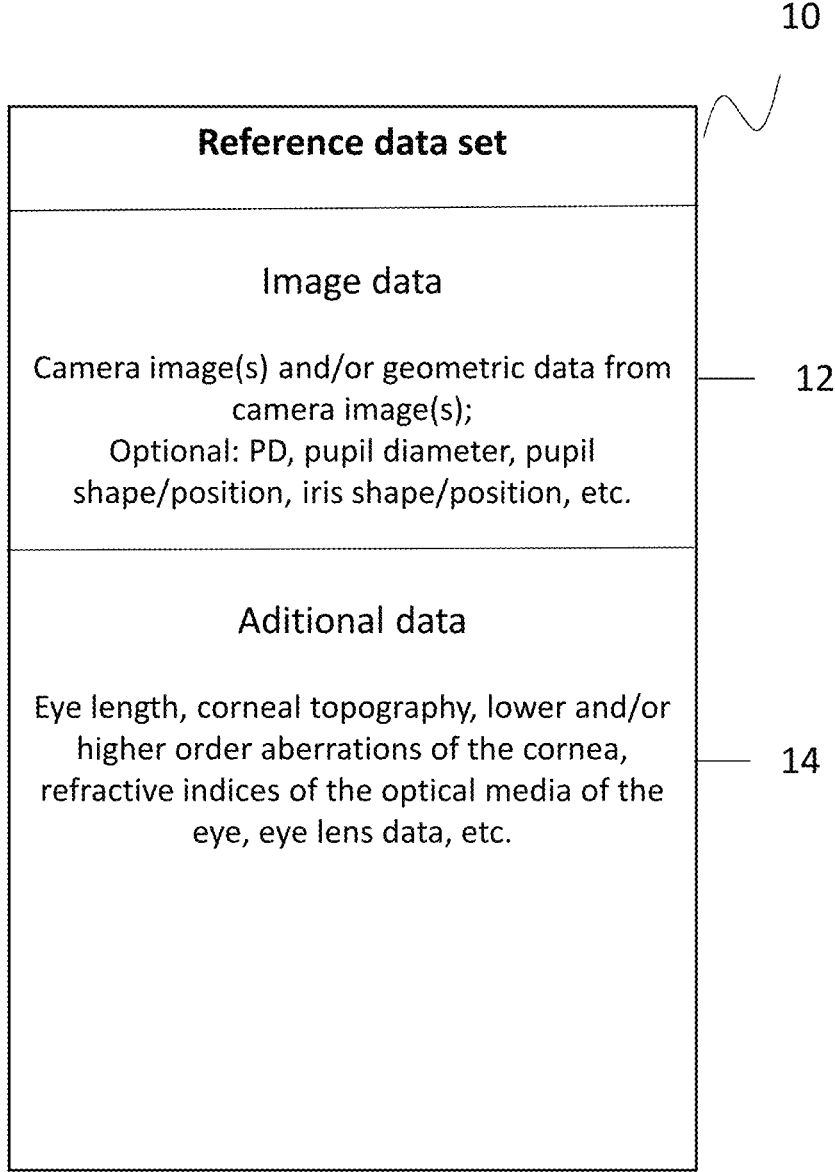
FIG. 2 an exemplary reference data set.

An exemplary reference data set 10 is shown in FIG. 2. The image data 12 in particular includes one or more of the following data or parameters:

one or more camera images in which at least one eye, preferably both eyes, can be seen in particular from the front;

one or more camera images in which at least one eye can be seen in particular from the side;

pupillary distance;

distance of the ocular centers of rotation (in particular as optical ocular centers of rotation);

corneal diameter (white-to-white, in particular measured horizontally);

the shape and/or position of the pupil or its parts (in a given representation, e.g. as closed or open polygon, as spline coefficients, etc.);

the shape and/or position of the outer edge of the iris or parts thereof (in a given representation, e.g. as closed or open polygon, as spline coefficients, etc.);

3D models of the eye area (e.g. as 3-dimensional point clouds, 3-dimensional edge networks that can be determined using depth cameras, etc.);

current direction of sight;

presence of heterophoria and/or preferably its form/extent.

The additional data 14 in particular includes one or more of the following data or parameters:

eye length (in particular the geometric overall length of the eye);

optical length of the eye (integral of the refractive index along a light beam of a given wavelength, such as 550 nm, passing through the point of sharpest vision on the retina and the center of the pupil);

one or more distances of the vertices of the refracting surfaces of an eye to each other or to another common reference point (e.g. the point of sharpest vision on the retina);

shape of the refracting surfaces (e.g. shape and/or tilting of the cornea or one of the lens surfaces) which can be present in a given parameterization (e.g. via radii of curvature in principal sections and their orientation, Zernike coefficients of the vertex depth, geometric curvatures or equivalent representations, e.g. as power vector or as polar representation) and which is to be understood relative to a coordinate system (e.g. relative to a coordinate system in which the direction of sight coincides with the negative direction of the z-axis and the x-axis lies in the horizontal plane);

diameter or radius of the physical aperture of the eye (i.e. the opening of the iris) or the optical entrance pupil (image of the iris through the cornea) which may be given for a given lighting condition (e.g. a given or average indoor lighting);

refractive indices of the optical media of the eye;

size and/or shape of the retina, in particular size and/or shape of the fovea;

orientation of the retina (in particular the fovea), e.g. as the direction of a vector perpendicular to the retina in the point of sharpest vision relative to the light incidence direction (e.g. a light ray passing through the center of the pupil and the point of sharpest vision);

position and orientation of receptors on the retina;

size of the receptive fields on the retina.

To form the training data set, existing orders for biometric spectacle lenses can be used, for which the additional data have been recorded using a measurement method. Exemplary measurement methods are measurements using an aberrometer, a topographer, a Scheimpflug camera, an OCT and/or a biometer.

Step S2: A relation between the image data and the additional data is derived from the plurality of reference data sets using statistical methods. In other words, a statistical model is determined or trained on the basis of the training data set, which describes the relation, such as the correlation(s), between image data and additional data.

The determination of the statistical model can comprise, for example, training an originally untrained neural network with the training data set, which includes the plurality of reference data sets. The trained neural network can be tested using a test data set and/or can be validated using a validation data set. The test data set and the validation data set can each include a plurality of data sets (reference data sets) from previous orders, for example a plurality of the reference data sets shown in FIG. 2. Preferably, a reference data set included in the test data set is included in neither the validation data set nor the training data set. Similarly, a reference data set included in the validation data set is preferably included neither in the test data set nor the training data set.

Step S3: Providing an individual data set (individual order) that includes at least individual image data. The individual image data can be recorded by an optician as part of an individual order for spectacles for a user. The individual order can also include further individual information, in particular individual refraction data, in particular if this is individual information that can be determined without a complex measurement. This can include simple refraction data (in particular low-order aberrations) and/or also information about an individual situation of wear and/or ethnic group and/or age and/or height and/or gender and/or weight of the user.

Step S4: Calculating individual additional data (additional data) based on the individual image data included in the individual data set provided in step S3 and further based on the relation between image data and additional data determined in step S2. For example, the individual image data can be input to the trained neural network of step S2. The corresponding output data of the neural network can be used directly as the individual additional data. It is possible not to use the output data of the neural network directly, but to first subject this output data to further processing (such as checking for plausibility, smoothing, filtering, categorizing, converting, etc.).

Step S5: Calculating an individual spectacle lens based on the individual image data included in the individual data set provided in step S3 and further based on the calculated individual additional data of step S4.

The calculation of an individual spectacle lens in particular comprises the calculation of at least one surface of the spectacle lens based on the individual image data and the calculated individual additional data. The surface thus calculated can be the back surface or the front surface of the spectacle lens. "Calculation of at least one surface of a spectacle lens" includes the calculation of at least a part of a surface or a piece of a surface. In other words, "calculation of at least one surface of a spectacle lens" means a calculation of at least part of the surface or calculating the entire surface.

The surface opposite the calculated surface can be a simple surface, such as a spherical, a rotationally symmetric, an aspheric, a toric, or an atoric surface. It is also possible to calculate both surfaces individually.

The individual spectacle lens can be calculated using a known method, for example using the method known from document U.S. Pat. No. 9,910,294 B2.

Figure 3:
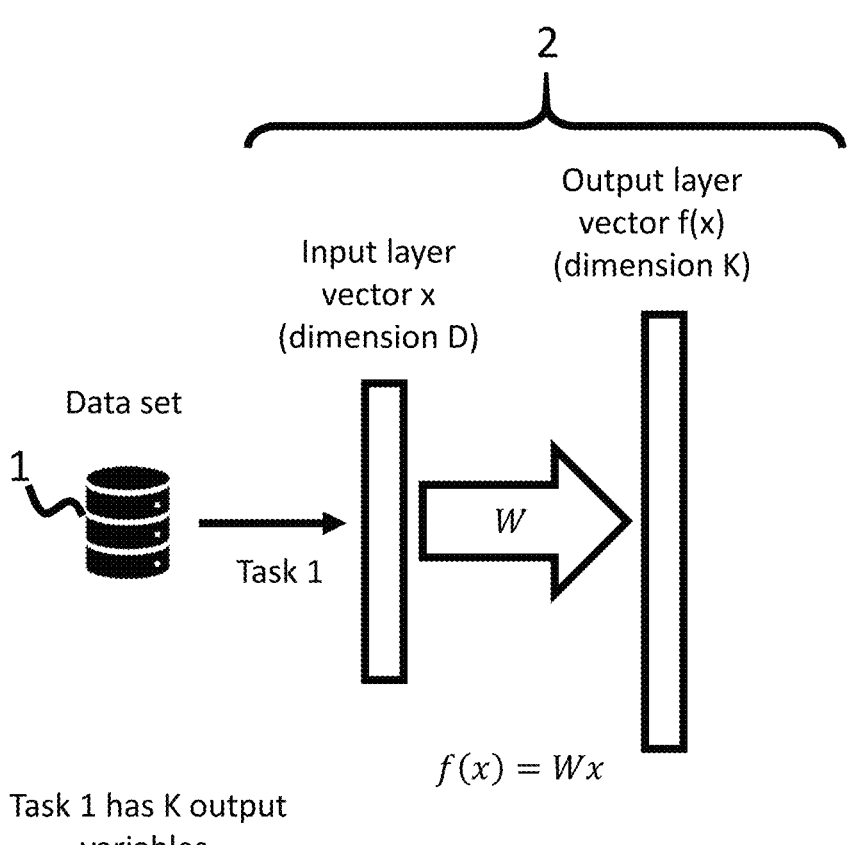
FIG. 3 an exemplary linear regression model.
Figure 4:
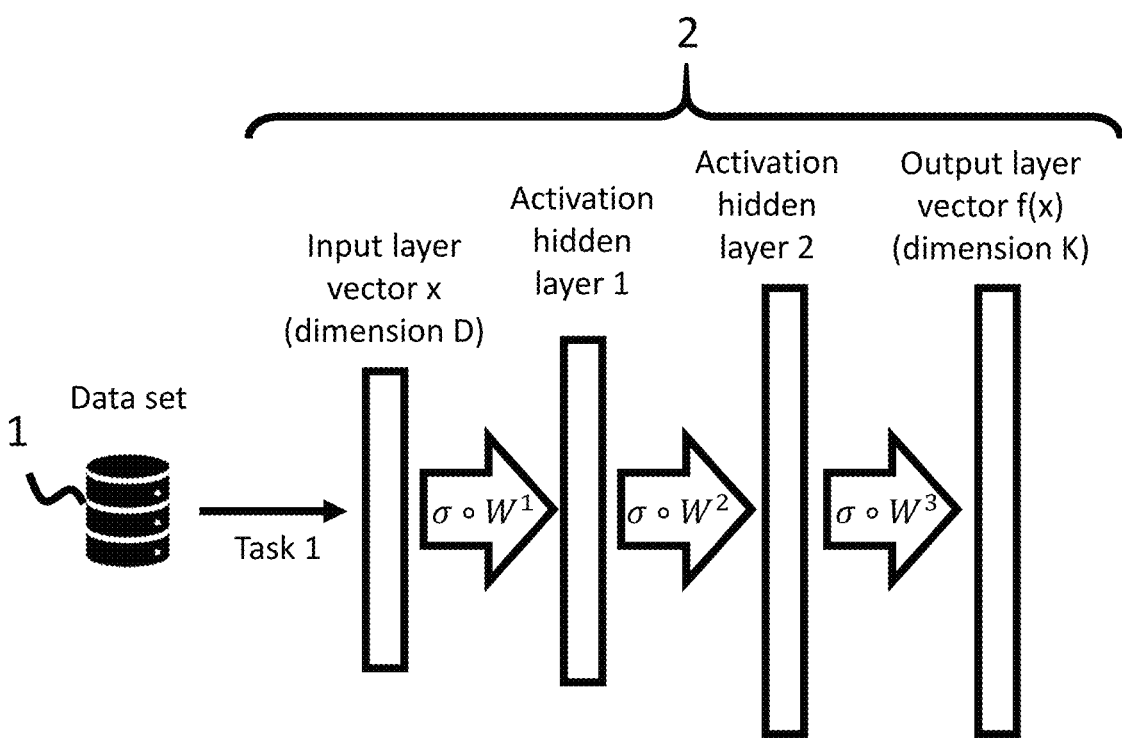
FIG. 4 an exemplary nonlinear regression model.

FIGS. 3 and 4 show exemplary statistical models 2 each trained on the basis of a training data set 1. Thus, such statistical models can be designed at least partially as neural networks.

If the statistical model is based on a neural network or consists of one, then for example an input layer of the neural network is occupied with at least a part of the image data and/or auxiliary variables calculated therefrom. The output layer outputs values for at least one additional parameter or at least a part of the additional data. The neural network can preferably also contain one or more hidden layers in addition to an input and an output layer. During training of an initial, untrained neural network, the weights are changed using appropriate learning algorithms. The trained neural network specifies the relation between image data and additional data. The structure of the neural network (such as the number and types of layers, number and types of neurons in the different layers, the way the layers and neurons are linked to one another, etc.) and the learning algorithms can be different.

FIG. 3 shows an exemplary linear regression model with an input layer and an output layer. An output variable f(x)

with K variables is calculated from a multidimensional input variable x with a dimension D (e.g. D=26):

$$f(x) = Wx \qquad (1)$$

where $W \in \mathbb{R}^{D \times K}$ denotes the weighing matrix.

FIG. 4 shows an exemplary nonlinear regression model with an input layer, an output layer, and several hidden layers. Here, an output variable f(x) with k variables is calculated from a multidimensional input variable x with a dimension D (e.g. D=26):

$$f(x) = \sigma\left(W^3 \sigma\left(W^2 \sigma\left(W^1 x\right)\right)\right), \qquad (2)$$

$$\sigma(a) = \max(a, 0) \; \text{Rectified Linear Unit } (ReLU),$$

where $W^1 \in \mathbb{R}^{L \times D}$, $W^2 \in \mathbb{R}^{M \times L}$ und $W^3 \in \mathbb{R}^{K \times M}$ denote weighing matrices.

Figure 5A:
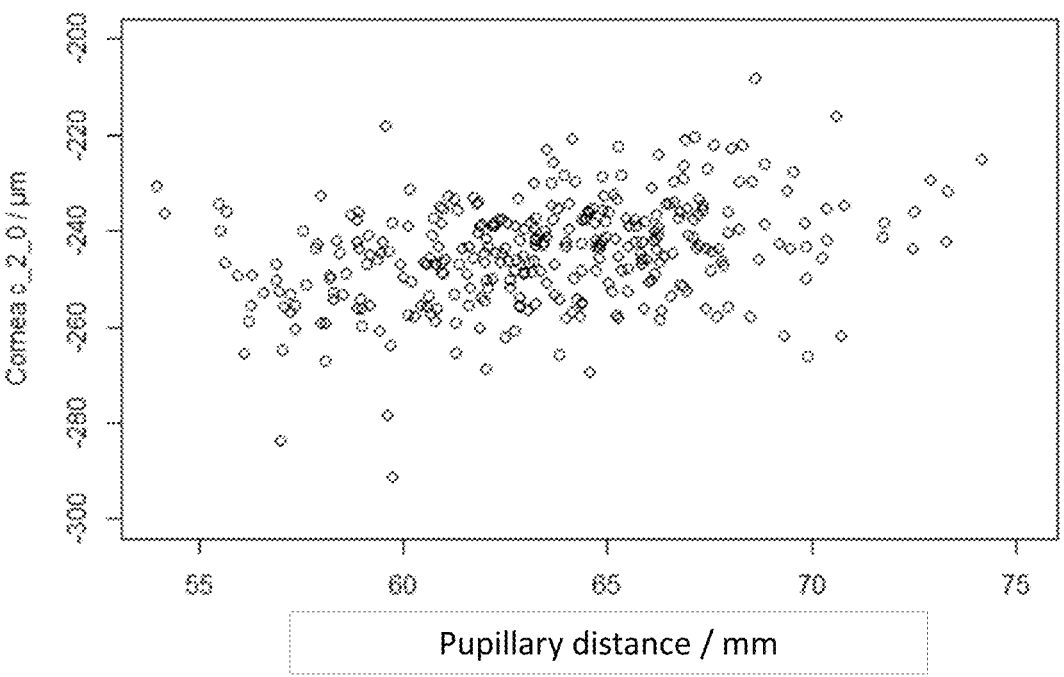
FIG. 5 the component $c_2^0$ of the Zernike coefficients of the cornea as a function of the pupillary distance (FIG. 5A) or as a function of the spherical equivalent (FIG. 5B).

FIG. 5 shows an example of a preferred embodiment using an exemplary linear model. The example shown is based on a calculation of the Zernike coefficients of the cornea of an eye with a diameter of about 7 mm around the corneal apex from the pupillary distance. This means that the pupillary distance is used as image data. It can in particular be or have been determined directly or indirectly from at least one image of at least a part of an eye area of the user. In particular, FIG. 5A shows a training data set including a large number of reference data sets which, for a large number of people or pairs of eyes, relate the respective pupillary distance with the associated Zernike coefficient $c_2{}^0$ (mean curvature) of the cornea for a radius of 3.55 mm.

Preferably, a simple linear regression is used as a statistical model, with which the Zernike coefficient of the cornea developed around the corneal apex with the radius of 3.55 mm is determined from the pupillary distance (PD) as a parameter associated with the eye area. For the individual determination of the Zernike coefficients, the model parameters are determined in the statistical model using a linear regression:

$$c_2^0 \, (PD) = -304.1 \; \mu m + 0.9422 \; \mu m/mm \; PD.$$

The predictive power of this model is 0.11 (adjusted R-squared).

By adding additional terms, such as white-to-white (WTW), one can improve the model:

$$c_2^0 \, (PD, WTW) = -329.7 \; \mu m + 0.9841 \; \mu m/mm \; PD + 2.172 \; \mu m/mm \; WTW$$

The predictive power is now 0.15 (adjusted R-squared).

Figure 5B:
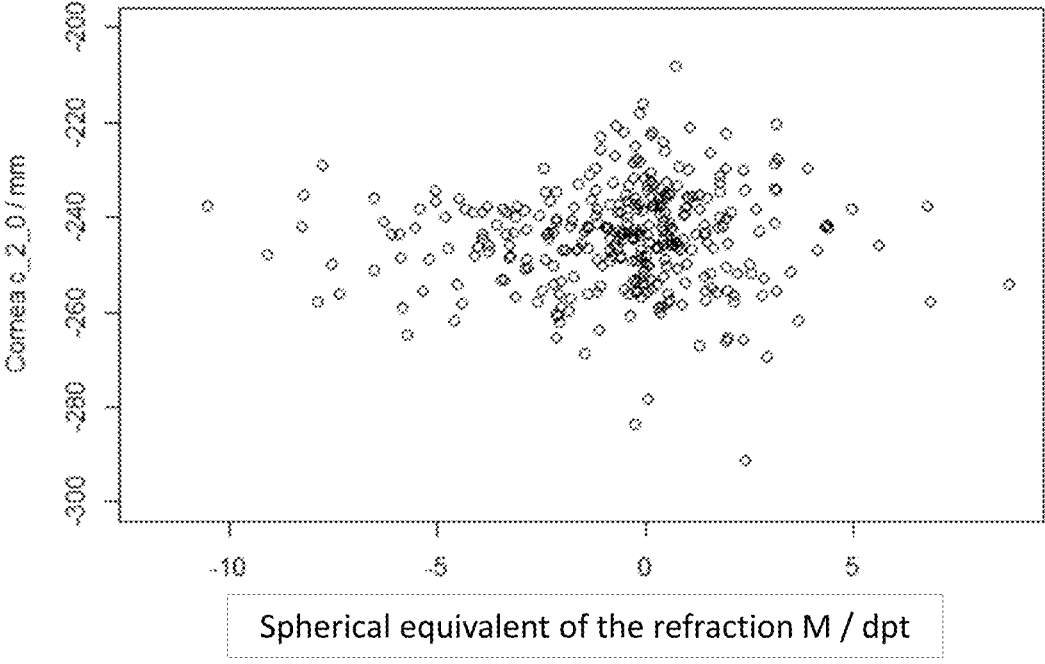

A comparison with FIG. 5B also shows that with the inventive approach of using individual image data, (statistical) correlations with (optically) relevant parameters for the individual spectacle lens optimization and manufacture become accessible, which conventionally were not expected or are to be expected as such. In particular, FIG. 5B shows a statistical distribution of the mean corneal curvature ($c_2{}^0$) as a function of the spherical equivalent of the refraction of the associated eye. Even if viewed physiologically isolated a change in the mean corneal curvature has a very large influence on the spherical equivalent of the eye refraction, statistically there is no pronounced correlation between the mean corneal curvature and the spherical equivalent. In the case of very simple (not individually optimized) spectacle lenses, knowledge of the spherical equivalent is sufficient to be able to select a suitable spectacle lens. For an improved, individual manufacture or adjustment of spectacle lenses, however, it is clearly beneficial to know details about individual refracting surfaces of the eye, for example. Thus, with knowledge—or at least with the statistical estimation—of the mean corneal curvature (as additional data), an improved individual adjustment of spectacle lenses can usually be achieved. This advantage of knowing (or approximating) the additional data is achieved with very simple means in the manner according to the invention.

Other parameters that are not necessarily associated with the eye area (e.g. age and/or gender of the user) can be used as well. Instead of linear functions, nonlinear functions (e.g. neural networks) can also be adjusted, and also distributions of the residuals other than the normal distribution (e.g. in order to be able to robustly determine the model parameters from the data that may include outliers).

In a further preferred embodiment, statistical statements about the eye length (AL) are made using image data, namely in particular again based on the pupillary distance, in particular taking into account the spherical equivalent (M) of the refraction. For the individual determination of the eye length, the model parameters are determined in the statistical model by means of a linear regression:

$$AL(PD, M) = 18.2 \ mm - 0.382 \ \frac{mm}{dpt} M + 0.0821 \ PD$$

The predictive power of this model is 0.67 (adjusted R-squared).

The use of a geometric parameter of the eye area, namely the pupillary distance (image data), brings advantages over the prediction purely from the spherical equivalent, as the comparison of the predictive power of a linear model without considering the pupillary distance shows:

$$AL(M) = 23.4 \ mm - 0.360 \ \frac{mm}{dpt} M$$

The predictive power of this model is 0.63 (adjusted R-squared).

In a further preferred embodiment, information about the corneal topography is determined using image data. A trained, deep artificial neuronal network is preferably used as a statistical model, which is or is being trained for a relation between images of the eye area (image data) and the cornea. topography (additional data). In particular, the last layers of a network that is possibly already pre-trained on image data are preferably trained in order to determine the corneal topography. In particular, the eye biometrics can be determined at least partially and/or approximately from images of the head and/or the area around the eyes (image data), with at least one of the following features (possibly as an intermediate variable) being abstracted or learned by the statistical model as a feature formed in the statistical model: ethnic group, (approximate) age, head size (e.g. head circumference), eye color, height, weight. Other features for which a causal relation to be learned by the model is suggested or for which a corresponding correlation cannot be ruled out a priori are conceivable as well.

In addition to the image data, additional parameters (extension data) are preferably used in the creation and/or application of the statistical model as input data for training or determining the additional data, if they are available, such as ethnic group, (approximate) age, head size (e.g. head circumference), eye color, height, weight.

In a preferred embodiment, the additional data includes data on the corneal topography (e.g., as a curvature, as a Zernike polynomial, or using another common description), which, by means of the statistical model, is associated with at least two images of the eye area or eye taken from different directions (e.g. using a two-camera video centering device with 2 cameras) as image data. Distinctive points of the iris, which are imaged by different areas of the cornea, are preferably sought in the images. Under assumptions (e.g. iris is flat and/or the physical aperture stop is round, known refractive indices of the cornea and the anterior chamber of the eye), the shape of the cornea is then determined (e.g. by varying a mathematical model of the corneal front surface and possibly also the corneal back surface, as well as a model of the position of distinctive points on the iris), wherein the same physical model of the cornea must explain the position of the distinctive iris points in all images as well as possible. Particularly preferably, the images are recorded simultaneously so that the pupil is in the same state.

In particular as a special case, the invention relates in a preferred embodiment to a determination of the anterior chamber depth, in particular under the assumption that the iris and the boundary between the cornea and the sclera lie in the same plane.

It is also possible to use the ellipticity of the pupil shape (image data) to draw conclusions on the astigmatism of the cornea (additional data).

Since values may already be derived from the images of the eye area (e.g. white-to-white of the corneal diameter), it is possible to use a statistical model to calculate more complex properties of the eye biometry (e.g. a naturally occurring corneal shape in an appropriate parameterization and/or the anterior chamber depth and/or a central thickness or a thickness distribution of the cornea) without unnecessarily having to restrict oneself to an overly simplified model (e.g. a model of the cornea as part of a spherical or torus surface). In this way, the naturally occurring forms of the cornea can be optimally estimated. Assumptions about the iris or pupil can also depend on a statistical model of other parameters, such as age, refraction, ethnic group, gender, or other known variables (see possible parameters above).

A further preferred embodiment relates to the determination of the corneal topography (additional data) from the shape of the line running between the cornea and sclera (image data), or alternatively or in addition from the outer boundary of the iris (image data). Preferably, the shape of the line running between the cornea and the sclera or the shape of the outer boundary of the iris is parameterized, e.g.:

horizontally and vertically measured white-to-white a flat elliptical shape of the line, parametrized e.g. by semi-axes and possibly also their orientation with respect to the horizontal a flat shape made up of two circular sections or elliptical sections a 3-dimensional shape of the line, which is determined e.g. by several images from different directions (e.g. using a stereo camera system)

a parameterization using Fourier coefficients of the distance of the boundary from a designated point (e.g. centroid of the pupil) as a function of the angle If the line (between the cornea and scleara or alternatively or in addition the outer boundary of the iris) is not entirely visible in images (e.g. because parts of the lid cover it), in the case of a suitable parameterization, which represent an assumption about the shape of the line, the parameters can nevertheless be determined in particular using a statistical model. The parameters can relate to a length that is already known (e.g. by using already calibrated data, or e.g. by allowing an approximate calibration across a known pupillary distance).

The corneal topography is preferably determined from these parameters in turn using the statistical model by prediction from an existing data set that includes both known corneal topographies and suitable parameters of the boundary between the cornea and sclera.

Another preferred embodiment relates to the determination of the corneal topography (additional data) from the geometric profile of just a single section of the corneal surface, e.g. the vertical section of the cornea in a camera image from the side (image data), using a statistical model, wherein other variables can also be taken into account in the statistical model.

In summary, it is to be noted that conventional video centration is known to be used to improve lenses individually, but not by estimating parameters associated with the biometrics of the eye using a statistical model. For example, a pupil diameter or a pupil distance can be determined, but this is done without using a statistical model, which improves the determination of these parameters, for example by imaging the physical aperture stop of the eye (iris) through a cornea that is not known in detail, but which can be estimated using a statistical model.

Within the scope of the present invention, the data relating at least to the eye area can have been determined from images in which one or two eyes can be seen. Such image data can be determined in particular from a greater distance and can also be carried out much more quickly than a complete measurement of the eye biometry.

The data associated with the eye biometrics can be geometric data (e.g. description of the refracting surfaces of the eye, and if there are several surfaces, their relative positions to one another) and they can in particular include the shape of the cornea (e.g. as one of the corneal surfaces, in particular the front surface of the cornea). In this way, a complex eye model can be determined, with which spectacle lenses can be better individually adapted, without the need for complex measurements having to be carried out for determining the complex eye model in individual cases and without corresponding measuring devices having to be available.

The data associated with the eye biometrics can also be related to one eye alone (as a distinction to the eye rotation point, which is a biometric parameter of the head or a pair of eyes, but not a biometric parameter of an individual eye per se). The optical properties of a complex eye model can be determined using such parameters relating to one eye alone, which in turn can be used to calculate improved spectacle lenses without the need for corresponding measuring devices to be present in individual cases for determining the complex eye model. In particular, in order to determine such an eye model in the individual case (i.e. after the statistical model has been provided), no lighting device specially designed for this is required (as e.g. in the case of a keratometer or a Scheimpflug camera). A simple lighting device such as an LED is sufficient, which may possibly only be switched on briefly (e.g. as a flash to illuminate at least the eye area).

In particular, in a preferred embodiment, the invention relates to a method for determining the biometry of the eye, comprising the following steps:

recording image data of the eye using a camera system with one or two cameras, which are preferably calibrated with respect to one another (stereo camera system);

providing and/or applying a statistical model, which on the basis of at least one of the following input parameter sets as an input parameter set predicts the biometrics (e.g. corneal curvature or anterior chamber depth):

parameter set 1: imaging of the iris through the cornea with one or two cameras from one or different angles.

parameter set 2: border of the iris parameter set 3: pupillary distance of the person, wherein providing the statistical model comprises a training process, during which, in addition to the parameters 1 and/or 2 and/or 3, the associated biometrics of the eye is known and used for training. Both the border of the iris and the pupillary distance can be determined from the images.

REFERENCE NUMERAL LIST

1 training data set
2 statistical model
10 reference data set
12 image data
14 additional data
S1 to S5: method steps

The invention claimed is:

1. A computer-implemented method for determining individual biometric parameters of at least one eye of a user, comprising:

providing image data comprising:

at least one image of at least a part of an eye area of the user; and/or geometric information about at least a part of the eye area of the user, which results directly from the at least one image of the at least a part of the eye area of the user; and determining individual additional data including at least one individual biometric parameter of the at least one eye of the user, based on the image data provided, and using a statistical model describing a relation between the image data and the additional data, wherein the statistical model is derived or has been derived using statistical analysis of a training data set with a plurality of reference data sets, each of the reference data sets including image data and additional data assigned to the image data.

2. The method according to claim 1, further comprising:

providing the training data set; and deriving the statistical model using statistical analysis of the training data set, wherein the deriving the statistical model comprises training an original model using the training data set.

3. The method according to claim 1, wherein the image data comprises parameters selected from a group of parameters consisting of:

one or more camera images in which the at least one eye is be seen from a front;

one or more camera images in which the at least one eye is from a side;

pupillary distance;

distance of ocular centers of rotation;

corneal diameter;

a shape and/or position of the pupil or its parts;

a shape and/or position of an outer edge of an iris or parts thereof;

three-dimensional models of an eye area;

a current direction of sight; and presence of heterophoria and/or preferably its form/extent.

4. The method according to claim 1, wherein the at least one individual biometric parameter is selected from a group of parameters consisting of:

a geometric overall length of the at least one eye;

optical length of the at least one eye, integral of a refractive index along a light beam of a given wavelength, passing through a point of sharpest vision on a retina and a center of a pupil;

one or more distances of vertices of refracting surfaces of an eye to each other or to another common reference point;

a shape of the refracting surfaces which is present in a given parameterization and which is to be understood relative to a coordinate system;

a diameter or radius of a physical aperture of the eye or an optical entrance pupil which may be given for a given lighting condition;

refractive indices of optical media of the eye;

size and/or shape of a fovea;

orientation of the fovea;

position and orientation of receptors on the retina; and size of receptive fields on the retina.

5. The method according to claim 1, wherein the statistical model is selected from a group of models consisting of: a linear model; a Gaussian process; a neural network; a decision tree or regression tree; a restricted Boltzmann machine; and a support vector machine.

6. A method for manufacturing a spectacle lens, comprising:

determining individual additional data including at least one individual biometric parameter of the at least one eye of the user, based on the image data provided according to the method of claim 1; and calculating the spectacle lens based on the determined individual additional data.

7. A non-transitory computer program product which, when loaded into and executed on a memory of a computer, causes the computer to carry out a method according to claim 1.

8. A device for determining individual biometric parameters of the at least one eye of the user, the device comprising a calculator designed to carry out the method according to claim 1.

9. A device for manufacturing a spectacle lens:

a device for determining individual biometric parameters of at least one of the eyes of a user according to claim 8;

a lens calculator designed to calculate the spectacle lens based on the determined individual biometric parameters.

* * * * *